United States Patent [19]

Okamoto

[11] Patent Number: 5,355,233
[45] Date of Patent: Oct. 11, 1994

[54] CONVERSION OF BINARY TO MULTI-LEVEL IMAGE DATA

[75] Inventor: Yoshifumi Okamoto, Yokohama, Japan

[73] Assignee: Canon Kabushiki Kaisha, Tokyo, Japan

[21] Appl. No.: 974,691

[22] Filed: Nov. 12, 1992

[30] Foreign Application Priority Data

Nov. 14, 1991 [JP] Japan .................................. 3-299265

[51] Int. Cl.<sup>5</sup> ............................................. H04M 1/22
[52] U.S. Cl. .................................... 358/455; 358/400
[58] Field of Search ............................... 358/443-445, 358/462-466, 452-456, 400

[56] References Cited

U.S. PATENT DOCUMENTS 4,467,366  8/1984  Bobick et al. ...................... 358/497
4,897,799  1/1990  Le Gall et al. ..................... 358/400

FOREIGN PATENT DOCUMENTS 191897  8/1986  European Pat. Off. ...... G06F 15/62
3831817  3/1990  Fed. Rep. of Germany ......... G06K 15/00
9002385  3/1990  PCT Int'l Appl. ......... G06K 15/02

OTHER PUBLICATIONS

*Patent Abstracts of Japan*, vol. 015153 (Kokai 1989/159316), Feb. 1991.

Primary Examiner—Stephen Brinich
Attorney, Agent, or Firm—Fitzpatrick, Cella, Harper & Scinto

[57] ABSTRACT

When binary image pixel data is converted into multi-level pixel data, the values of multi-level pixel data are previously set in predetermined registers. A circuit is provided for deciding whether or not the values set in the register are written in memory in accordance with the state of binary pixel data. N control circuits are provided in parallel, and N memory units to be respectively connected to the control circuits are also provided. This simultaneously multi-levelizes N items of binary pixel data.

38 Claims, 11 Drawing Sheets

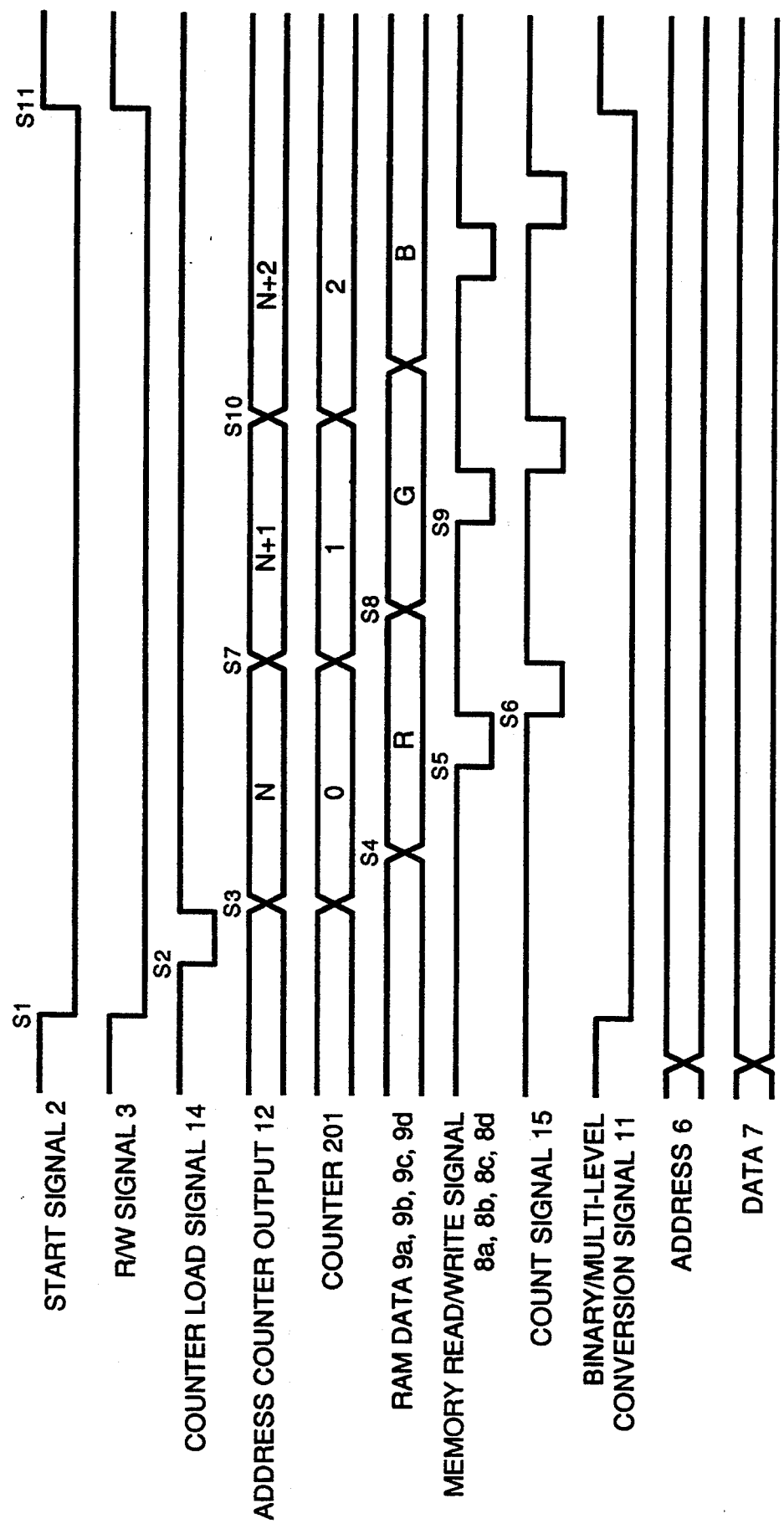

F I G. 11

| COLOR | Y | M | C | Bk |
|-------|----|----|----|----|
| XXX | XX | XX | XX | XX |
| XXX | XX | XX | XX | XX |

CONVERSION OF BINARY TO MULTI-LEVEL IMAGE DATA

BACKGROUND OF THE INVENTION

The present invention relates to an image processing apparatus, and particularly to an image processing apparatus for converting input binary pixel data into multi-level pixel data.

A multi-color printing apparatus which expands character information including color codes sent from a host computer or the like to an image in internal memory, and which then reads and outputs the image by printing is provided with separate memory units respectively corresponding to the three color components of Y (yellow), M (magenta) and C (cyan). Combination of the three color components enable multi-color display.

However, when a color image with gradation is printed on the basis of the multi-level data obtained by showing each of the color components by multi-level data, i.e., by multi-levelizing each color component, not a binary image such as a character or the like is recorded by a limited small number of colors, there is the need for processing of assigning the data about each of the color components which indicates the specified color to the dots of the binary image and storing the data in memory. The processing thus requires much labor, and the total printing speed is decreased.

SUMMARY OF THE INVENTION

The present invention has been achieved in consideration of the prior art, and an object of the present invention is to provide an image processing apparatus for converting binary pixel data into desired multi-level pixel data at a high speed.

In order to achieve the object in accordance with one aspect of the present invention, there is provided an image processing apparatus comprising N memory units having the same address space for storing multi-level pixel data, setting means for setting the multi-level data, N binary/multi-level conversion means for outputting the multi-level data set by the setting means on the basis of the state of the binary pixel data, supply means for supplying N items of binary pixel data to the corresponding binary/multi-level conversion means, means for writing the multi,level data output from the binary/multi-level conversion means i ($1 \leq i \leq N$) in the memory unit i of the N memory units, and control means for deciding whether or not the writing means is energized.

In another aspect of the present invention, there is provided an image processing apparatus for converting binary pixel data into multi-level pixel data for reproducing a desired color at a high speed comprising N memory units having the same address space for storing multi-level pixel data, setting means for setting the multi-level data about each of color components for reproducing a desired color, N-binary/multi-level conversion means for successively outputting the multi-level data about the color components set by the setting means on the basis of the state of the binary pixel data, supply means for supplying N items of binary pixel data to the corresponding binary/multi-level conversion means, means for writing the multi-level data output from the binary/multi-level conversion means i ($1 \leq i \leq N$) in the memory unit i of the N memory units, and control means for deciding whether or not the writing means is energized.

In a further aspect of the present invention, there is provided an image processing apparatus for converting binary pixel data into multi-level pixel data, comprising N memory units having the same address space for storing multi-level pixel data, setting means for setting the multi-level data about each of M color components for reproducing a desired color, M registers for holding the multi-level data about each of the M color components set by the setting means, a data bus of at least N bits, input means for inputting N items of binary pixel data in parallel from the data bus, and N conversion means for converting the input binary pixel data into multi-level pixel data. The conversion means i ($1 \leq i \leq N$) comprises pulse signal generation means for successively generating pulse signals in a number corresponding to the number M of the color components, and counting means for counting the number of pulses generated from the pulse signal generation means, which means is reset when inputting the binary pixel data from the input means. The conversion means further comprises output means for selecting one of the M registers on the basis of the number of pulses counted by the counting means and for outputting the multi-level data of the color component held in the selected register to the memory unit i, and signal output means for deciding whether or not writing in the memory unit i is permitted in accordance with the state of the binary pixel data i of the N items of binary pixel data.

Further objects, features and advantages of the present invention will become apparent from the following description based on the accompanying drawings and the claims depended thereto.

BRIEF DESCRIPTION OF THE DRAWINGS

FIG. 5 is a timing chart for explaining the operation of the binary/multi-level conversion unit in accordance with the embodiment;

Figure 11:
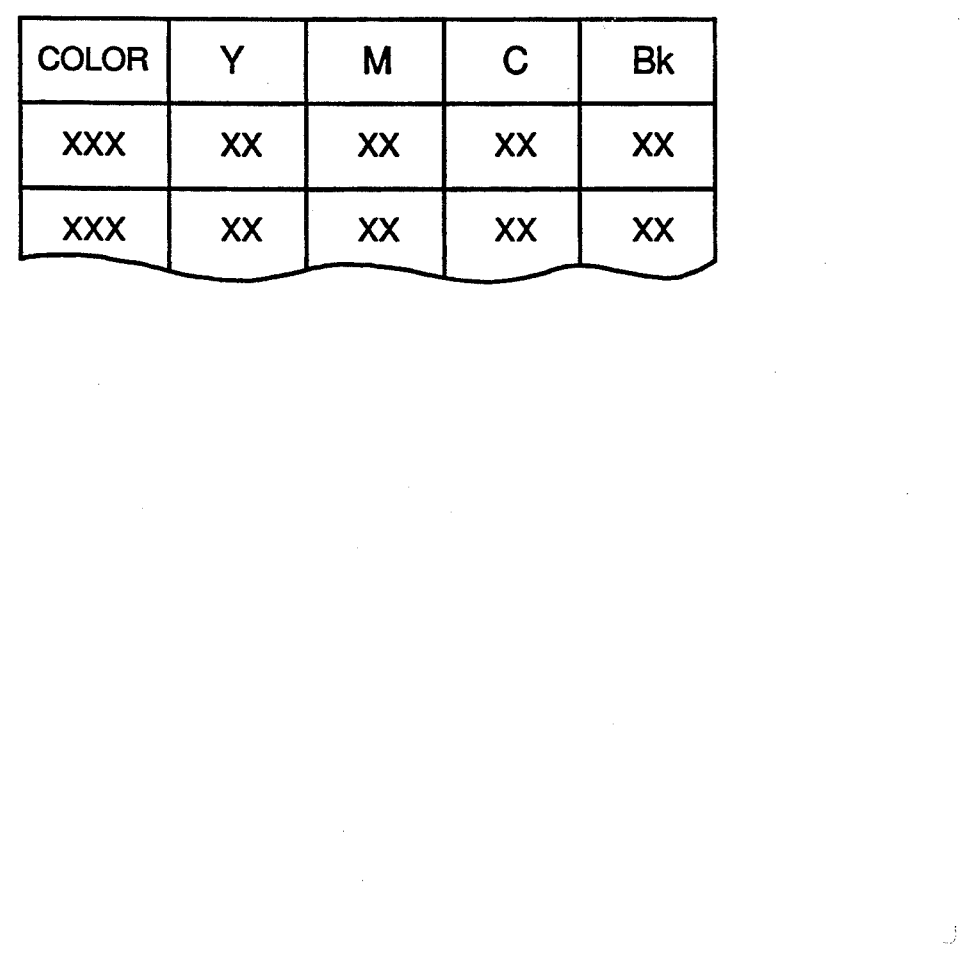

FIG. 11 a drawing showing an example of the table used for indicating a background or a binary image by color numbers.

DETAILED DESCRIPTION OF THE PREFERRED EMBODIMENTS

Embodiments of the present invention are described in detail below with reference to the accompanying drawings. The embodiments concern a multi-color printing apparatus.

Figure 6:
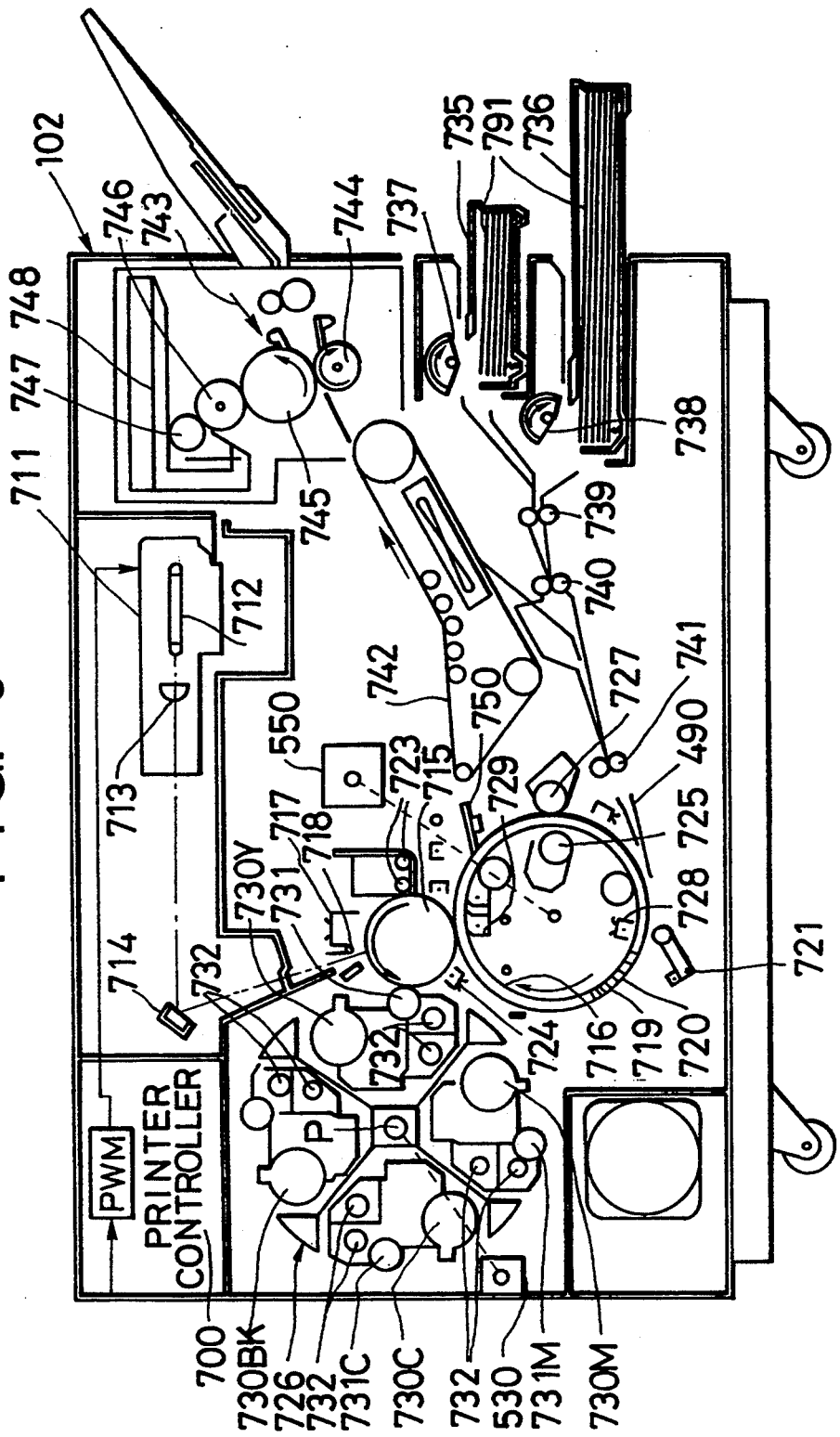
FIG. 6 is a drawing showing the sectional structure of a multi-color printing apparatus in accordance with the embodiment.

FIG. 6 shows the structure of a multi-color printing apparatus according to an embodiment.

In FIG. 6, a scanner section 711 has a laser output section (not shown) for converting the image signal supplied from a PWM (PULSE WIDTH MODULATION) section in a printer controller 700 into an optical signal, a polygon mirror 712 rotating at a constant speed, a motor (not shown) for rotating the polygon mirror 712 and an f/θ lens (imaging lens) 713 and so on.

The laser beam generated by the scanner section 711 is reflected by one side of the polygon mirror 712, and scans and exposes the surface of a photosensitive drum 715 through a reflecting mirror 714. Since the photosensitive drum 715 is rotated in the direction shown by an arrow in the drawing, a two-dimensional latent image is formed on the surface of the photosensitive drum 715.

A primary charger 717, a total exposure lamp 718, a cleaner section 723 for recovering the toner remaining untransferred and a transfer pre-charger 724 are disposed around the photosensitive drum 715.

Reference numeral 726 denotes a development unit for developing the electrostatic latent image formed on the surface of the photosensitive drum 715 by laser exposure. The development unit of the embodiment is configured as described below. Reference numerals 731Y, 731M, 731C and 731Bk respectively denote development sleeves which contact the photosensitive drum 715 so as to directly develop the image; reference numerals 730Y, 730M, 730C and 730Bk respectively denote toner hoppers for holding spare toners; and reference numeral 732 denotes a screw for conveying a developer. The sleeves 731Y to 731Bk, the toner hoppers 730Y to 730Bk and the screws 732 are disposed around the rotational shaft P of the development unit 726. The characters Y, M, C and Bk of the reference numerals respectively denoting the components of the apparatus show color components. Namely, "Y", "M", "C" and "Bk" show the color components of yellow, magenta, cyan and black, respectively. When a yellow toner image is formed, yellow toner development is performed at the position shown in the drawing. When a magenta toner image is formed, the development unit 726 is rotated around the shaft P shown in the drawing so that the development sleeve 731M in the magenta development portion is brought into contact with the photosensitive drum 715. A cyan or black toner image is formed by the same operation. Reference numeral 716 denotes a transfer drum for transferring the toner image formed on the photosensitive drum 715; reference numeral 719, an actuator plate for detecting the movement position of the transfer drum 716; reference numeral 720, a position sensor for detecting by approach to the actuator plate 719 that the transfer drum 716 is moved to a home position; reference numeral 725, a transfer drum cleaner; reference numeral; 727, a paper pressure roller; reference numeral 728, a destaticizer; reference numeral 729, and a transfer charger. These members 719, 720, 725, 727, 728 and 729 are disposed around the transfer drum 716.

On the other hand, reference numerals 735 and 736 denote paper feeding cassettes for containing paper (paper sheet). In the embodiment, A4-size paper and A3-size paper are contained in the paper feeding cassettes 735 and 736, respectively. Reference numerals 737 and 738 denote paper feeding rollers for feeding paper from the cassettes 737 and 738, respectively, and reference numerals 739, 740 and 741 denote timing rollers for timing the feed of paper and conveyance thereof. The paper supplied and conveyed through the above members is guided by a paper guide 490, is wound on the transfer drum 716 while the tip thereof is held by the gripper described below, and is then subjected to the image,forming process. The selection of paper feeding cassette 735 or 736 is determined by the indication from a printer controller 700 so that the selected paper feeding roller alone is rotated.

Reference numeral 550 denotes a drum rotation motor for synchronously rotating the photosensitive drum 715 and the transfer drum 716. Reference numeral 750 denotes a separation claw for separating the paper which electrostatically adheres to the transfer drum 716 therefrom after the image forming process. Reference numeral 742 denotes a conveyor belt for conveying the paper separated, and reference numeral 743 denotes an image fixing section for fixing the image to the paper conveyed by the conveyor belt 742. The image fixing section 743 has a pair of heat pressure rollers 744 and 745.

In the above constitution, the paper wound on the transfer drum 716 is successively subjected to the image forming processes for the respective color components. When the image forming process for the last color component is completed, the paper subjected to transfer treatment is separated from the transfer drum 716 by the separation claw 750, is conveyed to the image fixing section 743 by the conveyor belt 742 and is then subjected to fixing treatment. The paper is then discharged to the outside of the apparatus.

The structure for printing shown in FIG. 6 is referred to as "printer engine section" hereinafter.

Figure 2:
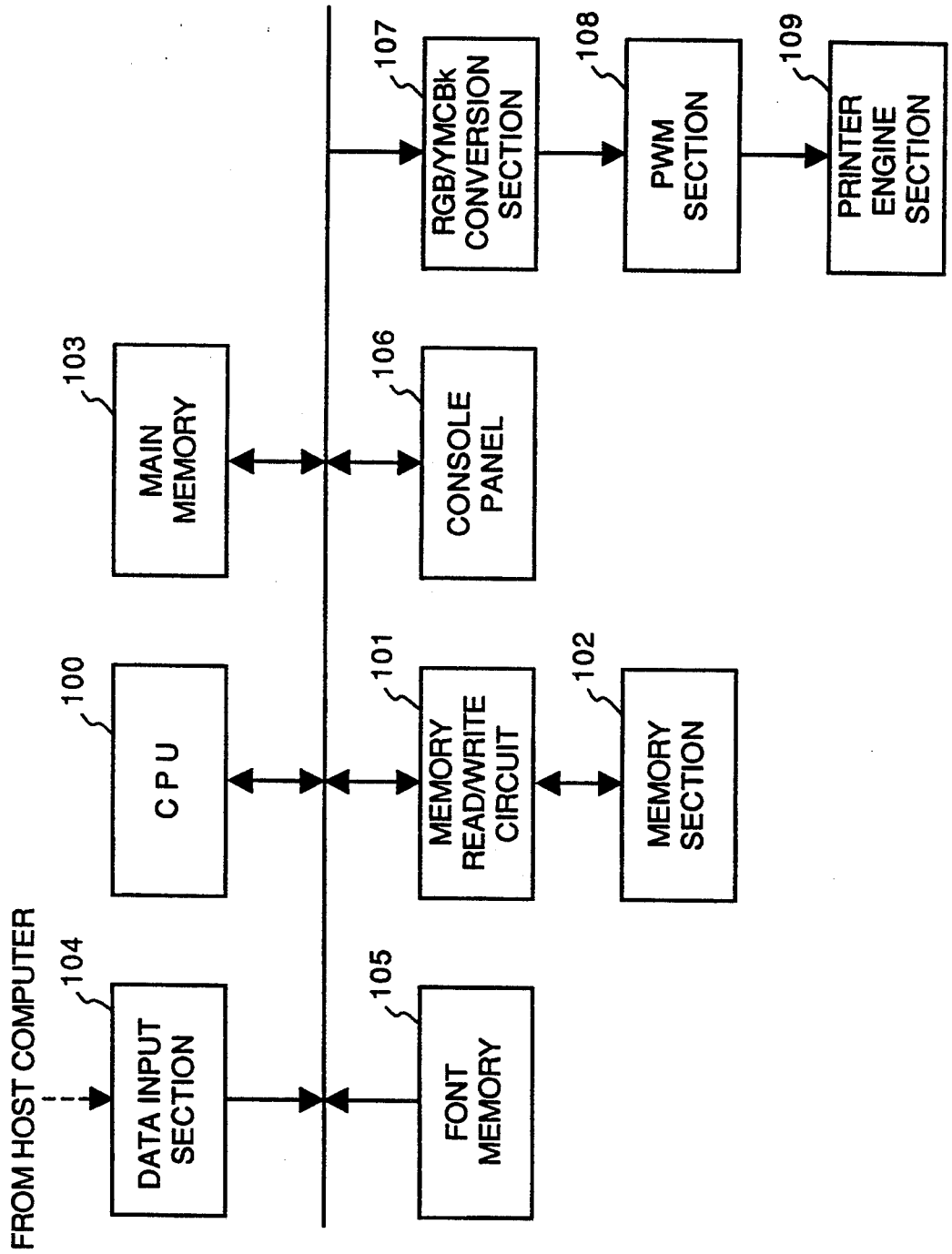
FIG. 2 is a block diagram schematically showing the whole configuration of an image processing apparatus in accordance with the embodiment.

FIG. 2 is a block diagram showing the configuration of the printer controller 700 of the embodiment.

In FIG. 2, reference numeral 100 denotes a CPU for controlling the printer controller 700 and the whole printing apparatus; and reference numeral 101 denotes a memory read/write circuit (described in detail below). Reference numeral 102 denotes a memory section for storing multi-level image data, the memory section being also described in detail below. Reference numeral 103 denotes main memory comprising an ROM for storing as a program the operating and processing procedure of the CPU 100 and an RAM used as a work area. Reference numeral 104 denotes a data input section for inputting printing data from an external host computer or the like, and reference numeral 105 denotes font memory for storing data for generating various font patterns. Namely, in the embodiment, data for drawing the outline of a character is stored in the font memory 105 so that the inside the outline drawn is painted to generate a character pattern. Like in a generally manner, a character pattern itself may be stored. Reference numeral 106 denotes a console panel for giving various indications; and reference numeral 107 denotes an RGB/YMCBk conversion section for converting R, G, B data into Y, M, C data and generating the image data about the black component Bk by under color removal. Conversion of the R, G, B data into Y, M, C, Bk is generally known and is thus not described below. However, the RGB/YMCBk conversion section 107 is operated under control of the CPU 100. For example, the operation when an image is recorded in the order of Y, M, C and Bk by the printer engine section shown in FIG. 6 is performed according to the following procedure:

The RGB/YMCBk conversion section 107 first generates data about the component Y on the basis of the RGB data sent from the memory section 102 and then outputs the data to a PWM section 108. The PWM section 108 converts the multi-level data about the component Y supplied into an analog signal, and compares the analog signal with a chopping wave to generate a pulse signal having a width corresponding to the value of the multi-level data. The pulse signal is output to the printer engine section 109 (refer to FIG. 6).

After the component Y is completely recorded for one sheet of paper, the component M is recorded. The components C and Bk are then recorded. When the recording of the component Bk is completed, the image is fixed to the paper, and the paper is discharged to the outside.

Although the embodiment concerns a case where a gradation image is reproduced by the PWM section, a gradation image may be formed by another known technique such as a dither method, an error diffusion method or the like.

In addition, although the embodiment concerns a laser beam printer as an example of printing apparatuses, the present invention is not limited to this. For example, the present invention can be applied to various printers such as an ink jet printer, heat transfer printer, a wire dot printer, an LED printer and the like.

The contents of the operation of the embodiment configured as described above are briefly described below.

Character code data, image data and control code data are sent as printing data from the host computer. The pixel data in the image data includes R, G, B data, and data about each of the color components is sent with 8 bits. Namely, data about a single pixel comprises 8×3 (=24) bits. The input data (24 bits) of the pixels are successively stored in the memory section 102.

On the other hand, in the case of the character code data, the host computer sends a command to specify the print color of the character before the character code sequence is output. The character is printed with the color based on the input command to specify the character color unless a new command to specify the character color is sent. The output color of the character is not specified only by the host computer, and the output color may be specified from the console panel (not shown).

When image data is received, an image is formed in accordance with the above procedure, while when the character code data is received, a character is printed by the following method:

When the character code data is received, the CPU 100 generates a character pattern on the basis of the data stored in the font memory corresponding to the character code. At this time, it is an important point that a single pixel of the character pattern comprises one bit to form a binary image. Namely, the character pattern in which a single pixel comprises one bit must be converted into a multi-level character pattern in which a signal pixel comprise 8×3 bits. Otherwise, the character pattern to be printed with the color designated by the memory section 102 cannot be expanded.

For example, when the host computer gives instructions to record a character with a color of R=32, G=64 and B=128, the pixel "1" of the character patter generated must be written as R=32, G=64 and B=128 in the memory section 102.

However, since the character pattern generated has many pixels, the conversion processing takes much time if the processing is performed for each of the pixels.

In the present invention, this problem is solved by the memory read/write circuit 101.

The CPU 100 sets R, G, B (8 bits each) data which expresses the character color designated by the host computer or the console panel, as described below. The generated binary character pattern is expanded as a multi-level image of the type in which the character of the corresponding color can be printed by simply writing the pattern in the memory section 102 through the memory read/write circuit 101. However, the embodiment concerns an example where the binary character pattern is written in units of four pixels, not units of one pixel. This enables an increase in the processing speed. Although the embodiment employs the units of four pixels, the units of five pixels or more may be employed.

Figure 1:
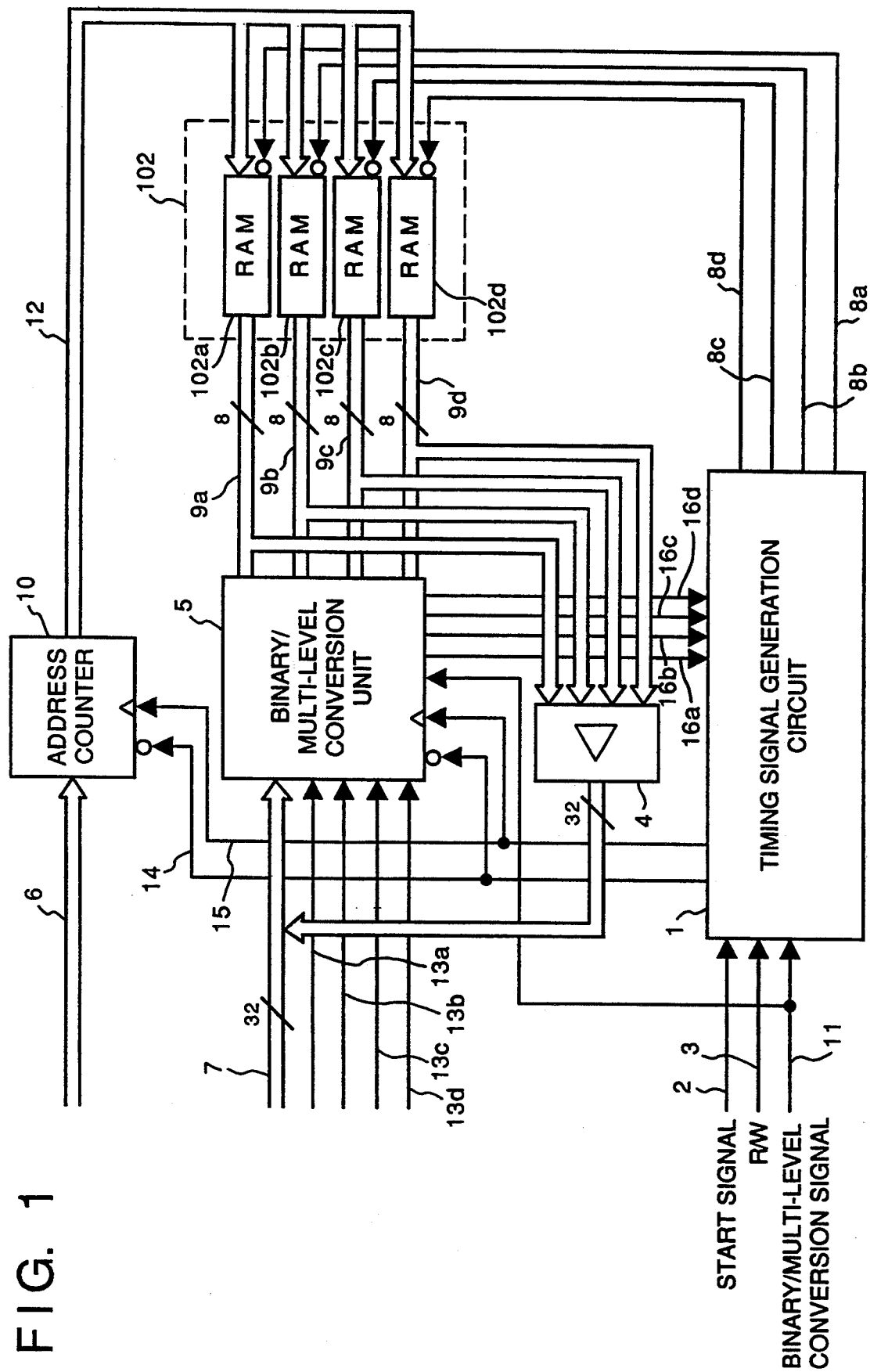
FIG. 1 is a drawing schematically showing the configuration of a memory read/write circuit in accordance with an embodiment.

FIG. 1 shows details of the configuration of the memory read/write circuit 101 and the memory section 102 in the embodiment.

In FIG. 1, arrows each indicate the flow of a signal or information, and numerals noted at intermediate positions of the arrows each indicate the number of bits which form the signal or information. Reference numeral 1 denotes a timing signal generation circuit which is started by a start signal 2 or a read/write (R/W) signal 3 output from the CPU 100 shown in FIG. 2 to generate various memory read/write timing signals. Reference numeral 11 denotes a binary/multi-level conversion signal which is activated by the CPU 100 when binary data is converted into multi-level data, i.e., when a character patter is written in the memory section 102. When the image data received from the host computer is written in the memory section 102, the binary/multi-level conversion signal 11 is inactivated. As shown in the drawing, the memory section 102 comprises four RAM 102a, 102b, 102c and 102d. The RAM 102a to 102d are positioned in the same address space.

In the RAM 102a are stored data about the pixel 0, the pixel 4, ... the pixel 4i. In this case, i shows 0 or an integer. If the values of the R, G, B color components (8 bits each) of the pixel n (n>0) are shown by $R_n$, $G_n$, $B_n$, the data about the pixel 4, $R_{4n}$, $G_{4n}$, $B_{4n}$, is stored in the RAM 102a. Similarly, data $R_{4n+1}$, $G_{4n+1}$, $B_{4n+1}$, data $R_{4n+2}$, $G_{4n+2}$, $B_{4n+2}$ and data $R_{4n+3}$, $G_{4n+3}$, $B_{4n+3}$ are stored in the RAM 102b, 102c and 102d, respectively.

In FIG. 1, reference numerals 8a, 8b, 8c and 8d denote the memory read/write signals for the RAM 102a, 102b, 102c and 102d, respectively, output from the timing signal generation circuit 1. The data is read in a high (H) level and written in a low (L) level. Reference numeral 4 denotes a buffer for the CPU 100 to read data from the memory section 102. Reference numeral 5 denotes a binary/multi-level conversion unit which converts the binary data supplied into multi-level data when the binary data about the character pattern is stored in the memory section 102. The converted multi-level data is written in each of the RAM 102a, 102b, 102c, 102d through data buses 9a, 9b, 9c, 9d, respectively.

Reference numeral 10 denotes an address counter which outputs the address 6 supplied from the CPU 100 under control of the timing signal generation circuit 1. The address counter 10 loads the address by a counter load signal 14 and counts it by a count signal 15. The counter load signal 14 and the count signal 15 are also supplied to the binary/multi-level conversion unit 5. Signals 13a, 13b, 13c and 13d are byte enable signals showing one of 4 bytes, or 32 bits, on the data bus 7, which is made enable by the CPU 100. The byte enable signals are respectively denoted by BE0, BE1, BE2 and BE3 hereinafter. The enable signals BE0, BE1, BE2 and BE3 correspond to the RAM 102a, 102b, 102c and 102d, respectively.

Reference numerals 16a, 16b, 16c and 16d denote write enable signals for the RAM 102a, 102b, 102c and 102d, respectively. The timing signal generation circuit 1 outputs the memory read/write signals respectively corresponding to the write enable signals 16a, 16b, 16c and 16d.

Figure 3:
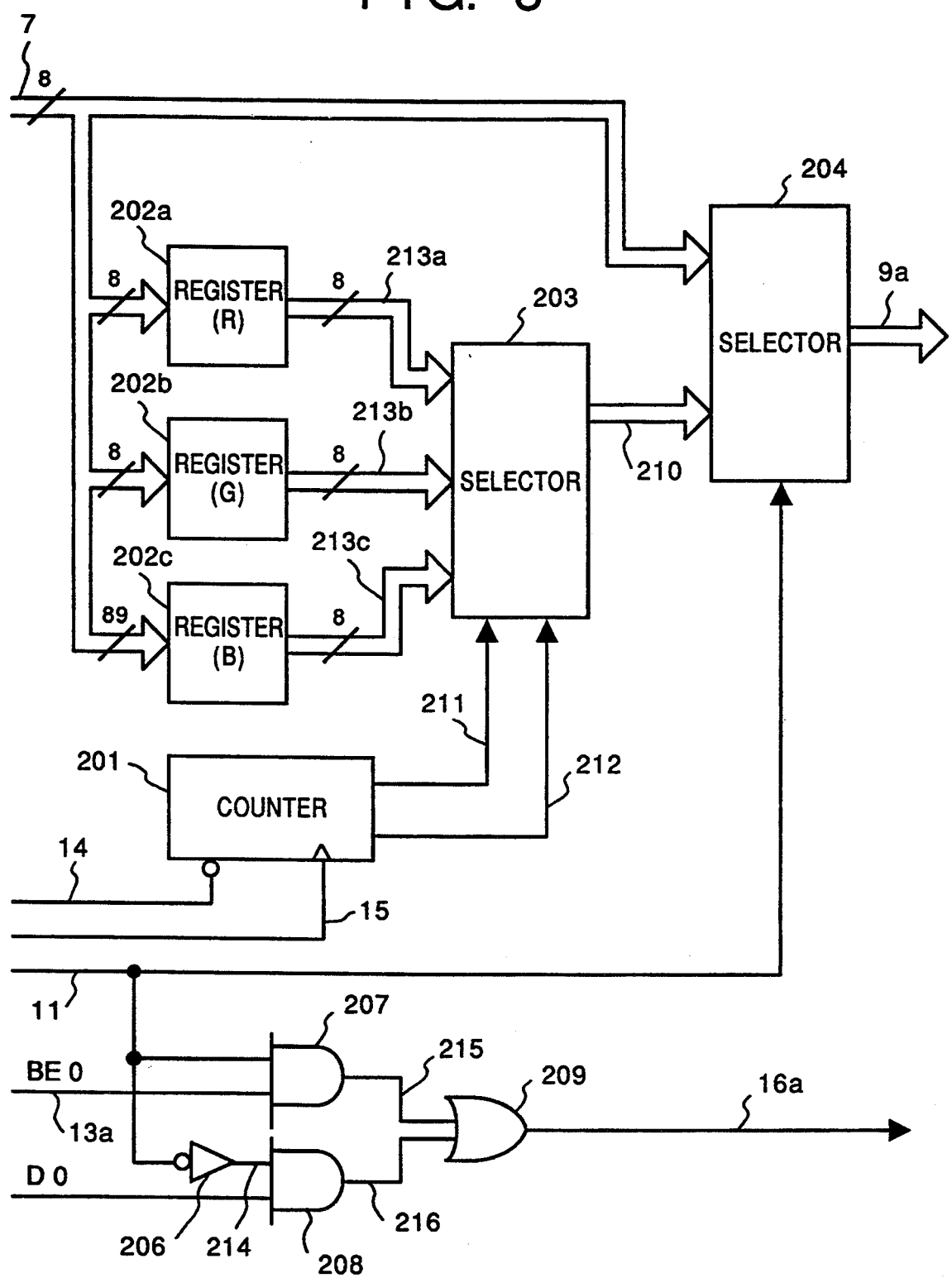
FIG. 3 is a drawing showing the configuration of a binary/multi-level conversion unit in accordance with the embodiment.

FIG. 3 shows details of the configuration of the internal circuit of the binary/multi-level conversion unit 5. The drawing shows the configuration of a circuit corresponding to the RAM 102a alone, i.e., binary/multi-level conversion for only a single pixel.

Since the configurations of the ARM 102b, 102c and 102d corresponding to the other three pixels are the same as that shown in FIG. 3, they are not shown and described below. Although, in FIG. 3, the bit supplied on the data bus 7 is D0 (LSB), the bits are respectively shown by D1 to D3, not D0, in the configuration of the circuit of binary/multi-level conversion for the other three pixel.

In FIG. 3, reference numeral 201 denotes a counter which is cleared by the counter load signal 14 output from the timing signal generation circuit 1 and which counts the address by the counter signal 15. However, the frequency of the count signal is at least 3 times that of the clock with which the CPU 100 transmits data to the memory read/write circuit. Reference numerals 202a, 202b, 202c respectively denote 8-bit registers for setting desired data therein by the CPU 100. The registers 202a, 202b and 202c are described in detail below. When the binary pixel data about a character pattern or the like is "1", the multi-level data (8 bits) about the components R, G and B after conversion are set in the registers 202a, 202b and 202c, respectively.

Reference numeral 203 denotes a selector for selecting one of the output 213a, 213b and 213c of the registers 202a, 202b and 202c on the basis of the output signals 211 and 212 of the counter 201. Reference numeral 203 also denotes a selector for selecting the data 7 (undermost 8 bits of 32 bits of the data bus) output from the CPU 100 or the output 210 from the selector 203 by the binary/multi-level conversion signal 11. The output of the selector 204 is supplied to a data bus 9a. The data on the data bus from the CPU 100 is connected directly to the RAM 102a in preparation for the case where the printing data received is image data. Namely, in the case of image data which needs not to be subjected to binary/multi-level conversion, data $D_0$ to $D_7$ on the data bus 7 may be written in the RAM 102a as it was. Hence data $D_8$ to $D_{15}$, data $D_{16}$ to $D_{23}$ and data $D_{24}$ on the data bus are respectively supplied to the selectors 204 in the binary/multi-level conversion circuits for the other three pixels.

Reference numeral 207 denotes an AND circuit for obtaining the logical product of the binary/multi-level conversion signal 11 and the byte enable signals BE0. Reference numeral 206 denotes an invertor circuit for inverting the binary/multi-level signal 11. Reference numeral 208 an AND circuit for obtaining the logical product of the data D0 (LSB) in the data bus 7 and the output signal 214 of the invertor circuit 206. Reference numeral 209 denotes an OR circuit for obtaining the logical sum of the output 215 and 216 of the AND circuits 207 and 208.

The operation of the binary/multi-level conversion unit 5 of the embodiment configured as described above is described below with reference to FIGS. 1, 3, 4 and 5. FIG. 4 is a drawing showing an example of the binary/multi-level conversion processing of the embodiment, and FIG. 5 is a timing chart explaining the operation of the embodiment.

Figure 4A:
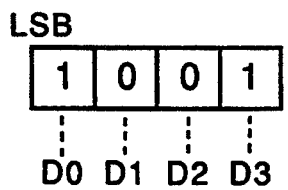
FIGS. 4A to 4D are drawings for explaining the contents of binary/multi-level conversion processing in accordance with the embodiment.
Figure 4B:
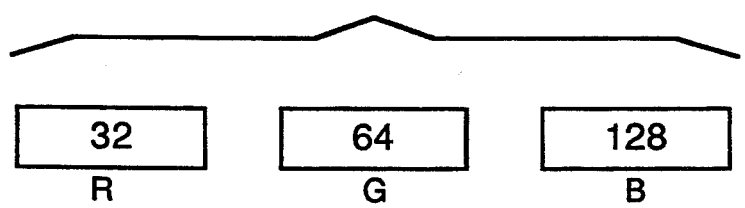

FIG. 4B shows an example of the value (8 bits) of each color component after binary/multi-level conversion, which is designated by the host computer or the console panel.

Figure 4C:
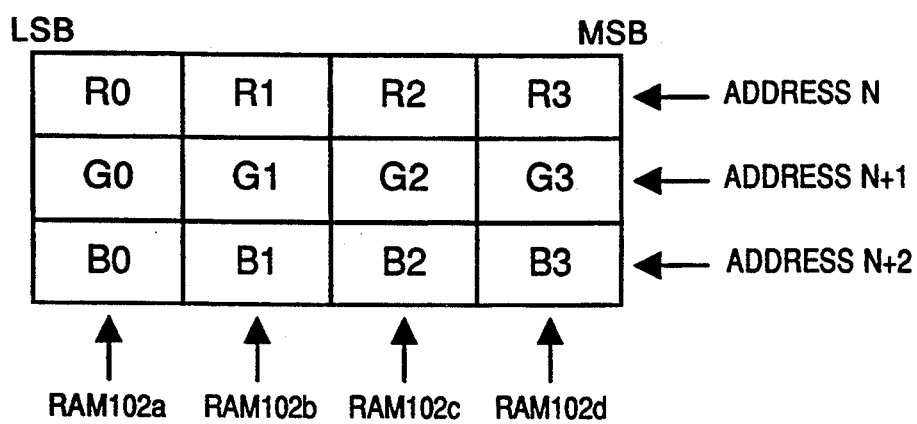
Figure 4D:
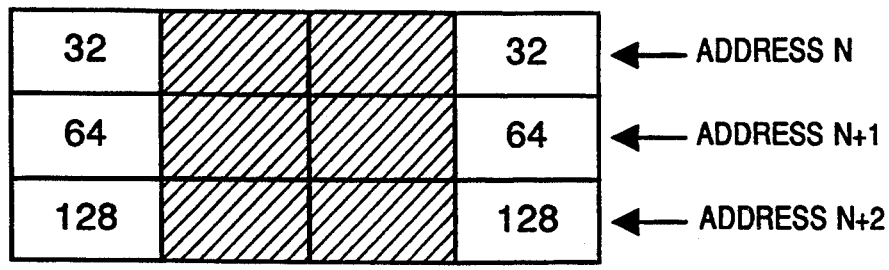

In FIG. 4C, the color components R, G, B with the same number correspond a single pixel, and numbers 0, 1, 2 and 3 shows storage in the RAM 102a, 102b, 120c and 102d, respectively. The data corresponding to four pixels of each of the components R, G and B is in the same address, and is shown by R0 to R3, G0 to G3 or B0 to B3.

The CPU 100 first sets 8-bit data indicating the gradation values of the color components R, G and B obtained when pixels in the bit state "1" are subjected to multi-level conversion in the registers 202a, 202b and 202c, respectively. In this example, R=32, G=64 and B=128 are set, as shown in FIG. 4B. The same data is also set in the registers 202a to 202c in the circuit for binary/multi-level conversion corresponding to the RAM 102b to 102d, respectively.

The CPU 100 outputs a binary pattern (4 bits=4 pixels) to be expanded on the memory 102 to lower 4 bits of the data bus 7. FIG. 4A shows an example of the data. The data shown in FIG. 4A represents that the first binary pixel is "1", the second and third binary pixels are each "0", and the fourth binary pixel is "1". As described above, the data D1 indicating the state of the second pixel is supplied to the AND circuit 208 in the circuit for binary/multi-level conversion for the RAM 102b, and the data D2 and D3 are supplied to the AND circuits in the circuits for binary/multi-level conversion for the RAM 102c and 102d, respectively.

The CPU 100 then outputs the start signal 2 to the timing signal generation circuit 1, and brings the read/write (R/W) signal 3 into the write state and the binary/multi-level conversion signal 11 into the low (L) level so that the binary/multi-level conversion unit 5 starts the binary/multi-level conversion operation. The timing of the start is shown by S1 in FIG. 5. The timing signal generation circuit 1 outputs the counter load signal 14 (S2). This causes the address counter 10 to receive the address 6 supplied from the CPU 100 and the counter 10 of the binary/multi-level conversion unit 5 to be cleared (S3). The selector 203 in the binary/multi-level conversion unit 5 selects the output of the register 202a, i.e., the gradation data about the component R, and outputs the data to the selector 204 when the output 211 and 212 of the counter 201 are in the logical levels (0, 0), respectively. When the logical levels of the output signals are made (0, 1) by counting up the counter by 1, the output of the register 202b, or the gradation data about the component G, is selected and output. When the logical levels of the signals are made (1, 0) by further counting up by 1, the output of the register 202c, or the gradation data about the component B, is selected and output. The selector 204 selects the data bus 7 from the CPU 100 when the multi-level conversion signal 11 is in the high (H) level, and selects and outputs the output 210 of the selector 203 when the signal 11 is in the low (L) level.

A more detailed description is made. The address 12 input to the memory units 102a to 102d shows the value "N" loaded from the CPU 100.

Since the counter 201 is cleared by the counter load signal 14, the output signals 211 and 212 of the counter 201 are (0, 0). The output of the register 202a, or the gradation data about the component R, is thus output as the output 210 of the selector 203 (S4). At this time, the AND circuit 207 is closed. The AND circuit 208 is opened when the data of D0 bit of the data bus from the CPU 100 is "1". As a result, the OR circuit 209 is opened to output the write enable signal 16a.

When the binary data shown in FIG. 4A is set, the write enable signals 16a and 16d are output so that the data is written in the RAM 102a and 102d, respectively. The timing signal generation circuit 1 then outputs the memory read/write signals 8a and 8d corresponding to the write enable signals 16a and 16d, respectively, and writes the gradation data about the component R which has been previously set (S5). The read/write signals 8b and 8c corresponding to the write enable signals 16b and 16c, respectively, are not output so that the data already stored in the memory units is left (refer to FIG. 4D).

The timing signal generation circuit 1 then outputs the count signal 15 (S6). The address counter 10 and the counter 201 in the binary/multi-level conversion unit 5 are counted up by "1" when receiving the count signal 15 so that the address of the RAM 102a to 102d becomes N+1, and the output 211 and 212 of the counter 201 become (0, 1) (S7). As a result, the output of the register 202b, or the gradation data about the color component G, is output from the selector 204 (S8).

Similarly, the memory read/write signals 8a and 8b are output, and the gradation data about the component G is written in each of the RAM 102a and 102d (S9). When the same processing is performed for the memory of the address N+2, the CPU 100 finishes the memory write operation for four pixels (S11).

Figure 7:
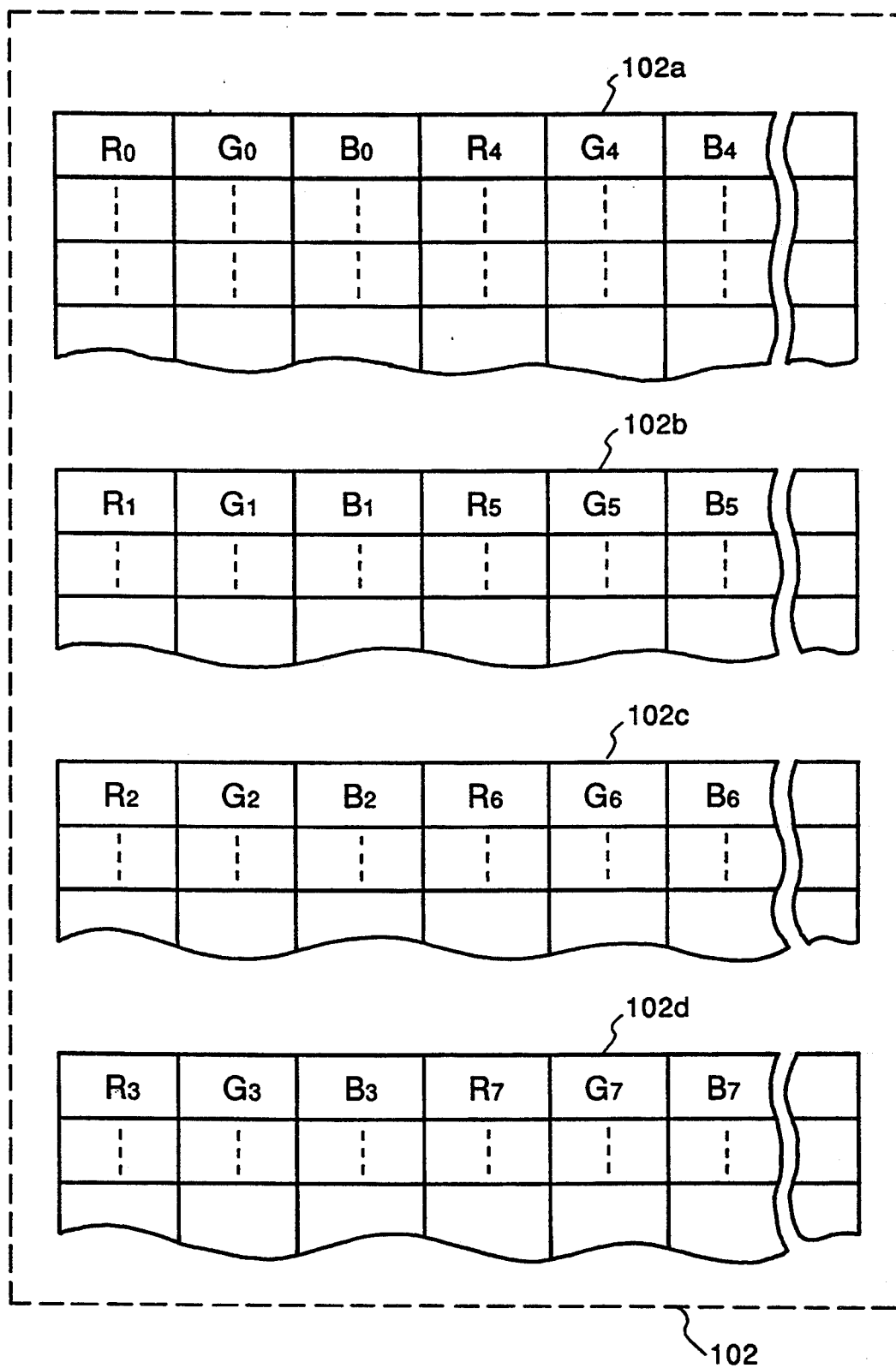
FIG. 7 is a drawing showing the state wherein image data is stored after binary/multi-level conversion.

FIG. 7 shows the data stored in the RAM 102a to 102d in the memory section 102 when the values of the components R, G and B of the pixel n are shown by $R_n$, $G_n$ and $B_n$, respectively.

When the CPU 100 writes any desired data without multi-level conversion processing (for example, when background data is written, or when image data is input from the host computer or the like), the level of the binary/multi-level conversion signal 11 is made "H". This causes 32 bits in the data bus 7 to be connected to the memory section 102. In other words, when image data is stored in the memory section 102 by the CPU 100, the 8-bit components R of the first, second, third and fourth pixels are transmitted as data D0 to D7, data D8 to D15, D16 to D23, and D24 to D31, respectively. The components G and B are transmitted in the same manner.

Since the level of the binary/multi-level conversion signal 11 is made "H", the selector 204 in each of the circuits of binary/multi-level conversion in the binary/multi-level conversion unit 5 selects 8 bits in the data bus 7 from the CPU 100. This permits the background color or the like to be freely changed. At this time, the AND circuit 208 in the binary/multi-level conversion unit 5 is closed, and the write enable signals 16a, 16b, 16c and 16d corresponding to the byte enable signals 13a, 13b, 13c and 13d, respectively, output from the CPU 100 are output. The timing signal generation circuit 1 performs write processing once and then completes the processing.

As described above, in the embodiment, the gradation data on each of the color components R, G and B after conversion is previously set when binary data is converted into multi-level data. At this time, only the binary data on pixels of "1" are converted into the multi-level data designated. In addition, in the embodiment, since the four binary pixels are simultaneously converted into multi-level pixels, the binary/multi-conversion is speeded up.

In addition, although the embodiment concerns the example in which the four pixels are processed in the binary pixel unit, if the number of the RAM in the memory section 102 is 32, and if 32 binary/multi-level conversion circuits are provided, binary/multi-level conversion using all bits in the data bus 7 can be made.

When expansion processing of multi-level data for one page is completed, the CPU 100 transmits the image data stored in the memory section 102 to the RGB/YMCBk conversion section 107. When the image data is read from the memory section 102, the data is read in units of 8 bits from each of the RAM 102a to 102d in the memory section 102 through the buffer 4. In the embodiment, since the data bus 7 has 32 bits, pixel data for four pixels is read by one read processing. However, since data about only one of the three color components is read by one read processing, the CPU 100 performs three times of read processing to read the R, G, B data for four pixels.

The RGB/YMCBk conversion section 107 contains a buffer memory having a predetermined capacity so as to receive the R, G, B data for four pixels sent from the CPU 100, generate multi-level data about the recording color components designated by the CPU 100 and output the data to the PWM section 108.

Figure 8:
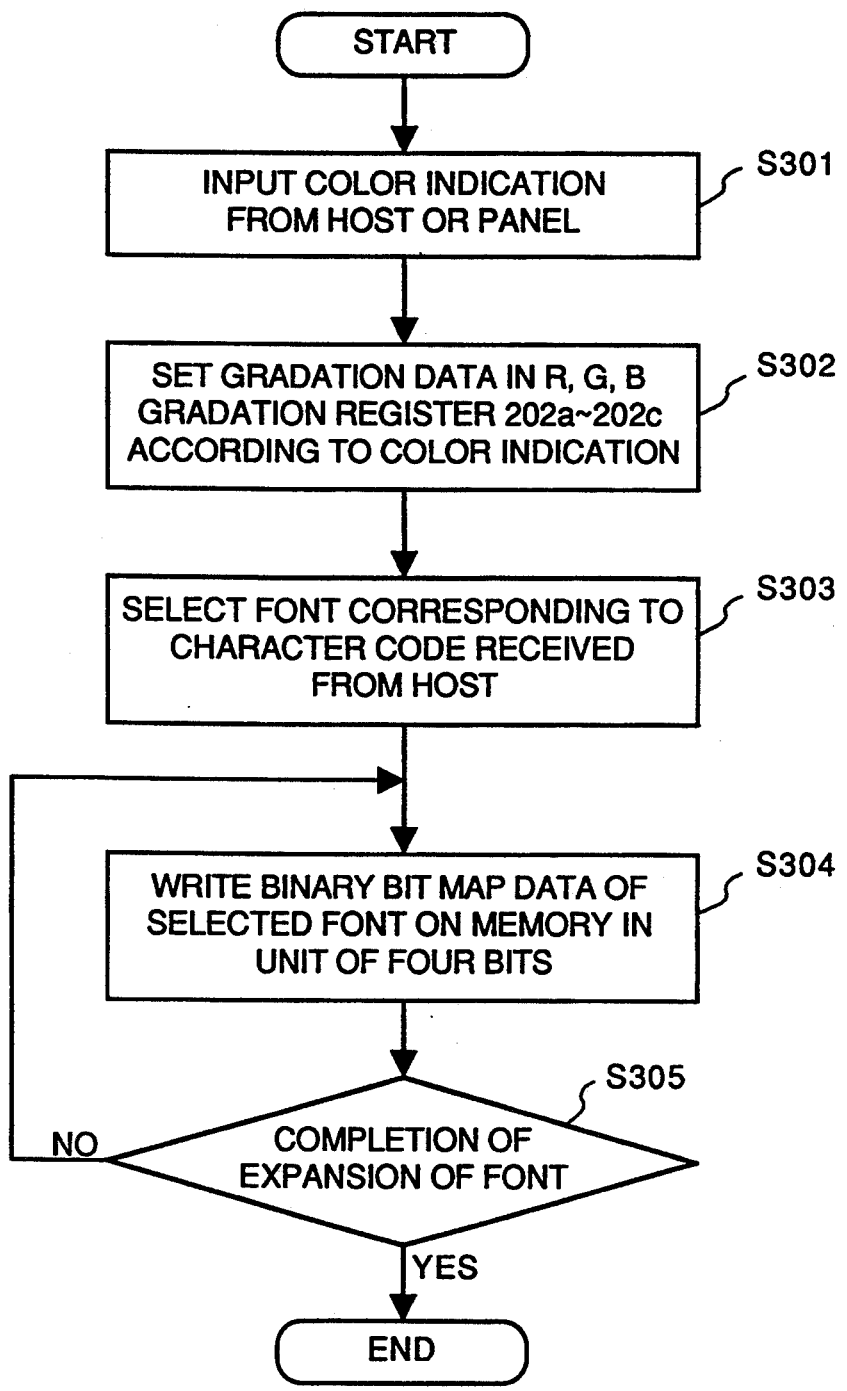
FIG. 8 is a flow chart of explaining the contents of the operations and processing of CPU in accordance with the embodiment.

A description will now be made of the contents of the operation of the CPU 100 until a character pattern is obtained on the basis of the character codes contained in the received printing data and is expanded in the memory section 102 with reference to the flow chart shown in FIG. 8. The program corresponding to the flow chart shown in FIG. 8 is stored in the ROM in the main memory 103. Character pattern expansion processing corresponding to a single character code is described below for the sake of simplification of the description.

In Step S301, color data (each color having 8 bits) of a binary image of a character or the like after conversion is received from the host computer or the console panel. In the next Step S302, the gradation values (8 bits each) of the color components R, G and B for reproducing the specified color are set in the registers 202a to 202c in the binary/multi-level conversion unit 5. In Step S303, a font pattern corresponding to the character code received from the host computer is generated and is written in the memory section 102 in units of 4 pixels, or 4 bits. As described above, bits of "1" in the four bits are converted into the R, G, B data having the gradation values designated and are then written in the memory section 102. In Step S305, a decision is made as to whether or not all font patterns are completely expanded. If it is decided that the pattern of one character is not completely expanded, the flow returns to Step S304. When the pattern of one character is completely expanded, the processing is finished.

When a control command to change the character color is sent from the host computer, the CPU 100 changes the multi-level data to be set in the registers 202a to 202c in order to record a subsequent character pattern with the changed color. As a result, the hue of a character can be changed from any desired position of a single page. When a character code and image data (R, G, B data each having 8 bits) are sent, the hue of a character alone can also be changed on the printer side.

Second Embodiment

Although, in the above embodiment, multi-level data about R, G, B are expanded in the memory section 102, and are converted into data about the recording color components by the RGB/YMCBk conversion section 107 in the recording step, data on the color components Y, M, C and Bk may be expanded directly in the memory section 102. In this case, the RGB/YMCBk conversion section 107 is unnecessary.

Figure 9:
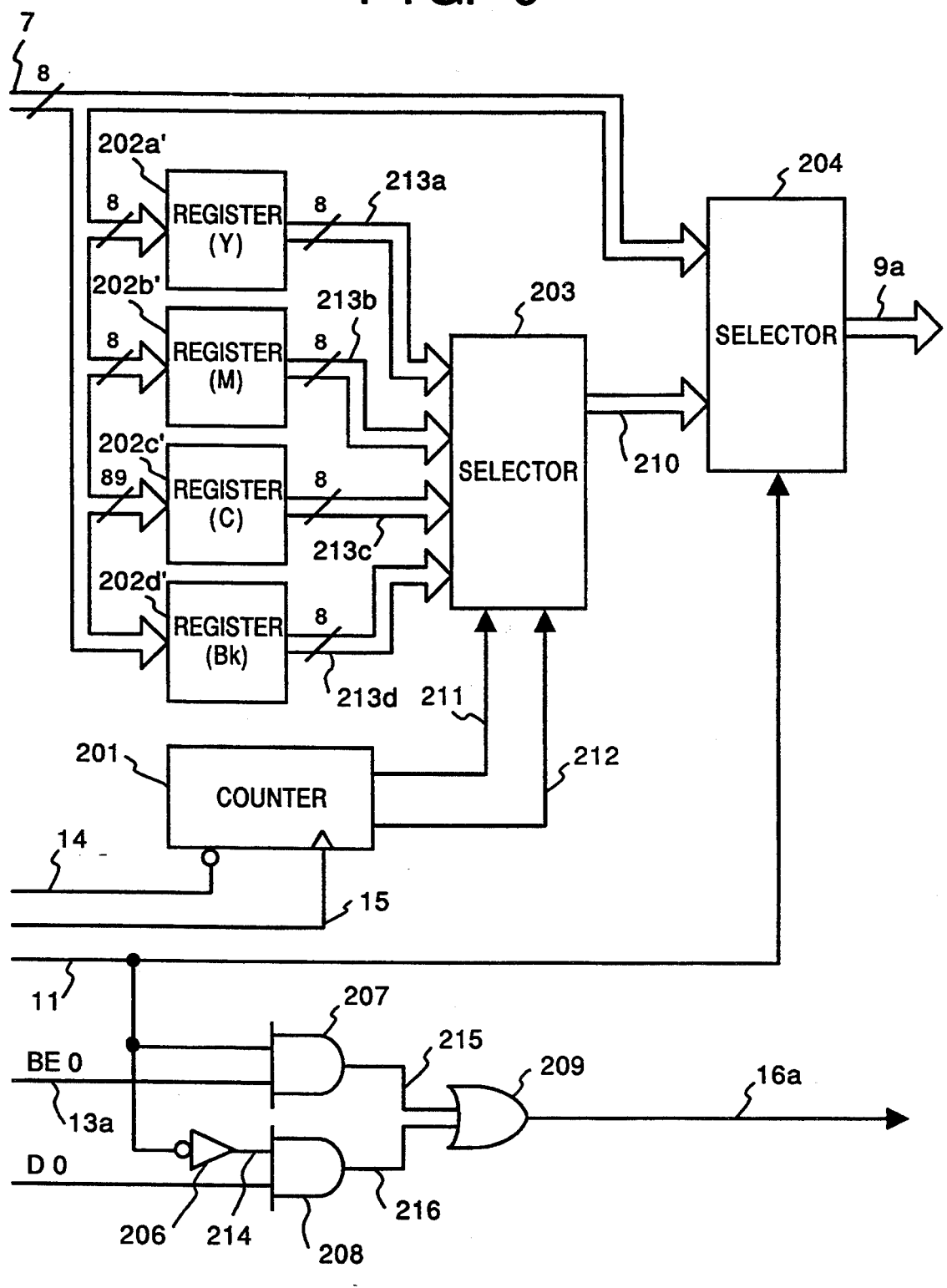
FIG. 9 is a drawing showing the configuration of a binary/multi-level conversion unit in accordance with a second embodiment.

FIG. 9 shows the configuration of the circuit of the binary/multi-level conversion unit 5 in the memory read/write circuit 102 according to a second embodiment.

The second embodiment is different from the first embodiment shown in FIG. 3 in only the point that the number of the registers for setting the gradation data about the color components therein during binary/multi-level conversion is increased by one. The reason for increasing the number of the registers by one is that the four recording color components Y, M, C, Bk are recorded in the second embodiment, while the three color components R, G, B are recorded in the first embodiment. Namely, in FIG. 9, the gradation data (8 bits) about the components Y, M, C and Bk are set in registers 202a', 202b', 202c' and 202d', respectively Since a selector 203' selects the output of one of the four registers and outputs the data selected, a signal of only 2 bits may be used as a selection signal. Namely, the signals 211 and 212 output from the counter 201 in the first embodiment may be used as they were.

If the logical levels of the signal lines 211 and 212 are expressed by (a, b), when the logical levels are (0, 0), (0, 1), (1, 0) and (1, 1), 8 bits are selected and output from the registers 202a', 202b', 202c' and 202d', respectively.

However, in the second embodiment, when a request for one writing is generated from the CPU 100, the binary/multi-level conversion unit 5 must perform four writing operations. This can be achieved by increasing the counting clock frequency of the counter 201 to at least four times that supplied to the CPU 100.

Figure 10:
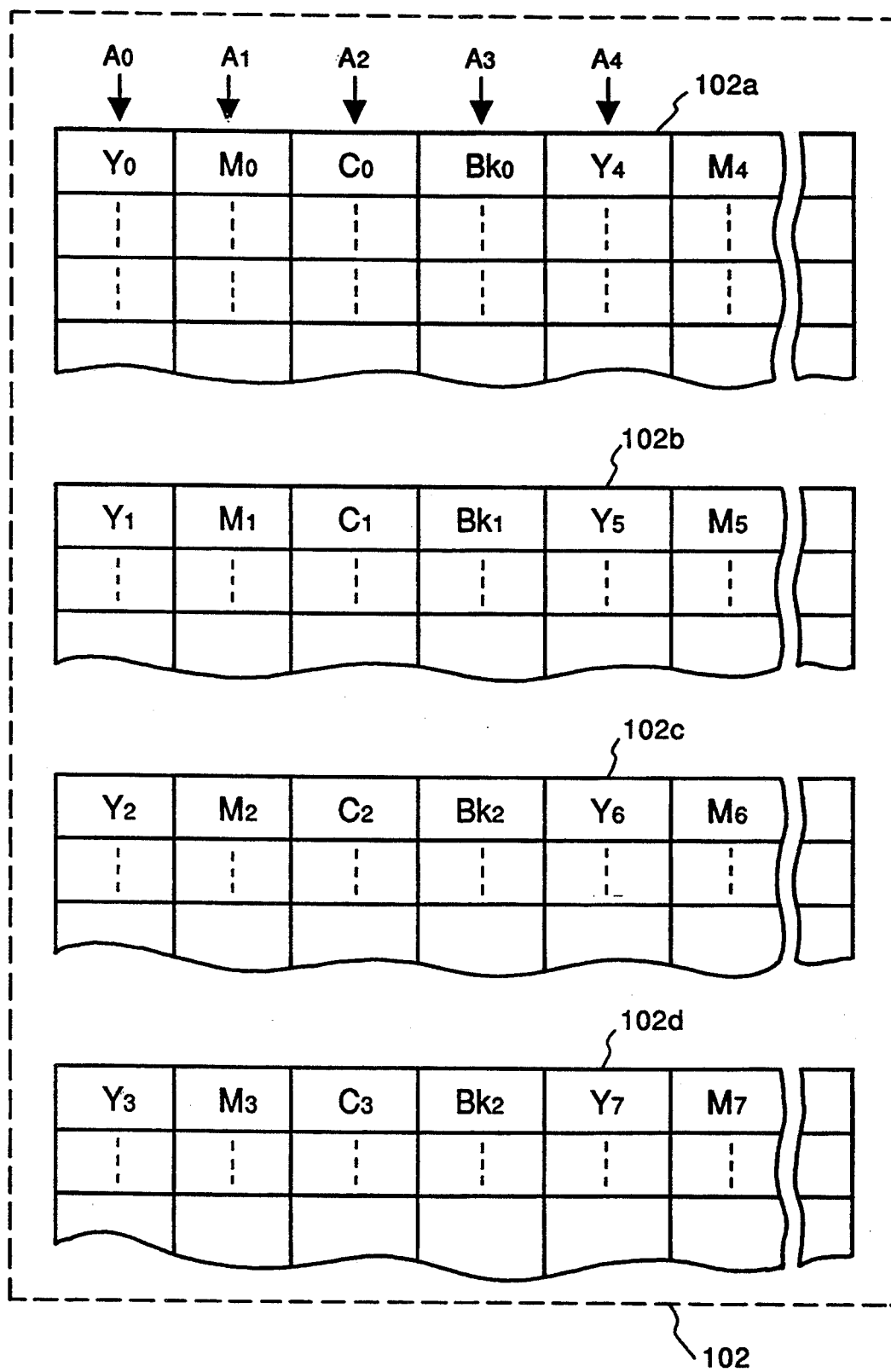
FIG. 10 is a drawing showing the state wherein image data is stored after binary/multi-level conversion in accordance with the second embodiment.

If the values of the recording color components n are shown by $Y_n$, $M_n$, $C_n$, $Bk_n$, the multi-level data about each of the recording color components is written in the RAM 102a to RAM 102d in the memory section 102 in the state shown in FIG. 10. However, the binary data "0" of pixels of a character pattern or the like are not written in the RAM 102a to 102d, like in the first embodiment. When the values of the components Y, M, C and Bk of a desired color are previously written in all of the RAM 102a to 102d in the memory section 102, a character of a desired color can be recorded with a background of a desired color.

The background color is designated by the host computer or the console panel 106. When the CPU 100 receives indications of the background color, the RAM 102a to 102d may be filled (painted out) with the values of each color component for reproducing the color specified. Thus this processing is not described below.

However, the function of the binary/multi-level conversion unit 5 of the aforementioned first or second embodiment is employed for speeding up the processing of painting the background color. Namely, the multi-level data of each of the color components for reproducing the background color is set in the registers 202a to 202c or 202a' to 202d', all the lower four bits of the data bus 7 are made "1" and written. This causes four pixels of the background image to be written by one write processing, thereby speeding up the processing.

In the second embodiment, since data is stored in the form of Y, M, C and Bk in the memory section 102, as shown in FIG. 10, the RGB/YMCBk conversion section 107 in the first embodiment need not be provided. The CPU 100 thus may transmit the data in the memory section 102 directly to the PWM section 108. If the component Y is recorded by the printer engine section 109, the first address $A_0$ of the memory section 102 is accessed to output color component data $Y_0$ to $Y_3$, which is then transmitted to the PWM section 108. The data about unrelated color components is skipped, and the color component data $Y_4$ to $Y_7$ at the address A4 is transmitted to the PWM section 108. After the data about the component Y is completed transmitted, data about the color components M, C and Bk are transmitted in this order.

The processing for storing a binary image in the memory section 102 by the CPU 100 in the second embodiment is substantially the same as that in the first embodiment shown in FIG. 8. However, in Step S302, the data about each of the color components Y, M, C and Bk for reproducing the specified color is set in the registers 202a to 202d. The other steps are the same as those shown in FIG. 8 and thus are not described below.

As described above, the first and second embodiments permit binary data to be converted into multi-level data having the gradation specified only by writing the binary data if the gradation value of the multi-level data is previously set in a predetermined register. The processing by the CPU can thus be simplified and speeded up. In addition, in the above-described first and second embodiments, since a plurality of binary pixels can be simultaneously converted in to multi-level pixels, the processing can be significantly speeded up.

Further, in the first and second embodiments, the console panel 106 is used as an example of means for setting gradation data in the registers 202a to 202c or the registers 202a' to 202d', and the user directly sets the values of gradation data in the registers. However, data about the color components to be set is data in a level which is recognized by the CPU or the like, and is thus data which cannot be easily understood by human beings. A desired color may be thus numbered so that data about each of the color components can be set in the registers indirectly by specifying the number of a desired color.

In this case, a table in which the value of a corresponding color component is stored in a color code may be prepared. This table is preferably stored, for example, in EEPROM or the like because the contents registered are not lost by power breakout, and the user can freely register a new color. Alternatively, a color may be specified by using a L*a*b* color specification space which can be easily understood by human beings. In this case, a program for realizing a operation expression used for converting into R, G, B or Y, M, C may be previously stored.

The memory for storing image data therein may be either a static RAM or dynamic RAM. In a dynamic RAM, an attempt can be made to speed up the processing in any one of the fast page, nibble and static column modes because continuous three addresses are accessed.

In addition, in the first and second embodiments, binary pixel data is transmitted by four signal lines of bits D0 to D3 in the data bus 7, and a circuit for binary/multi-level conversion is provided for each of the bits. However, since the multi-level data set in the register 202a in the conversion circuit for processing bit D0 is completely the same as that in the register 202a in each of the circuits for bits D1 to D3, the registers 202a to 202c or 202a' to 202d' may be one and the same. This decreases at least the number of the registers and can thus simplify the configuration of the circuit.

Further, although four pixels are simultaneously processed in the above embodiments, the number of pixels to be processed may be changed.

Particularly, when the number of pixels to be processed is a multiple of 4, for example, when processing is performed in units of eight pixels, means for latching 8 pixels (8 bits) set from the CPU 100 is provided so that after the lower 4 pixels of the latched 8 pixels are processed, the counter 201 is cleared, and the latched bits are shifted by 4 bits and then subjected to the same processing.

Further, although the above embodiments concern a multi-color printing apparatus as an example, the present invention can of course applied to a single-color printing apparatus. The apparatus can be applied to a printing apparatus, and any other apparatuses for converting binary image data into multi-level image data. For example, the present invention can be applied to an apparatus for displaying a gradation image on a display such as CRT or the like.

Further, although the above embodiments concern an example using the PWM section 108 and the laser printer for finally outputting an image, present invention is not limited to this. This is because examples of means for generating a gradation image, which can be used in the present invention, include the dither method, the error diffusion method and the like, and examples of printers which can be used in the present invention include a heat transfer printer, a wire dot printer, an ink jet printer and the like.

As described above in the embodiments, the gradation values of a binary image or a desired color thereof can be set from the console panel 106. If the host computer simply receives information indicating a monochromatic binary image, the user can set a desired density or color by operating the console panel of the printer. As a result, only a character in the printing data sent can be printed with the density or color specified by the user.

As many apparently widely different embodiments of the present invention can be made without departing from the sprint and scope thereof, it is to be understood that the invention is not limited to the specific embodiments thereof excepts as defined in the appended claims.

What is claimed is:

1. An image processing apparatus for converting binary image data into multi-level image data, comprising:
   N N≧2) memory units having the same address space for storing multi-level pixel data;
   setting means for setting multi-level data;
   N binary/multi-level conversion means for outputting multi-level data set by said setting means on the basis of the state of binary pixel data;
   supply means for supplying N items of binary pixel data to corresponding binary-multi-level conversion means;
   write means for writing the multi-level data output from the i-th (1≦i≦N) binary/multi-level conversion means in the i-th memory unit of said N memory units; and
   control means for deciding whether or not said writing means is energized.

2. An image processing apparatus according to claim 1, wherein said control means energizes said writing means when the binary pixel data supplied to the i-th binary/multi-level conversion means assumes a first state, and deenergizes said writing means when the binary pixel data supplied to the binary/multi-level conversion means i assumes a second state.

3. An image processing apparatus according to claim 1, wherein the multi-level data is manually set using said setting means.

4. An image processing apparatus according to claim 1, further comprising:
   read means for reading the multi-level data stored in said N memory units; and
   image forming means for forming a visible image on the basis of the multi-level data read.

5. An image processing apparatus according to claim 4, wherein said image forming means is a printer.

6. An image processing apparatus according to claim 1, further comprising:
   second setting means for setting desired multi-level data; and
   second writing means for writing, in advance, the multi-level data set by said second setting means in said N memory units.

7. An image processing apparatus for converting binary pixel data into multi-level pixel data, comprising:
   N N≧2) memory units having the same address space for storing multi-level pixel data;
   setting means for setting multi-level data about each color component for reproducing a desired color;
   N binary/multi-level conversion means successively outputting the multi-level data about each color component set by said setting means on the basis of the state of binary pixel data;
   supply means for supplying N items of binary pixel data to the corresponding binary/multi-level conversion means;
   write means for writing the multi-level data of each color component output from the i-th (1≦i≦N) binary/multi-level conversion means in the i-th memory unit of said N memory units; and
   control means for deciding whether or not said write means is energized.

8. An image processing apparatus according to claim 7, wherein said control means energizes said write means when the binary pixel data supplied to the i-th binary/multi-level conversion means assumes a first state, and deenergizes said write means when the binary pixel data supplied to the binary/multi-level conversion means i assumes a second state.

9. An image processing apparatus according to claim 7, wherein the multi-level data about each color component is manually set using said setting means.

10. An image processing apparatus according to claim 7, further comprising:
  read means for reading the multi-level data about each color component stored in said N memory units; and
  image forming means for forming a color visible image on the basis of the read multi-level data of each color component.

11. An image processing apparatus according to claim 10, wherein said image forming means is a color printer.

12. An image processing apparatus according to claim 7, further comprising:
  second setting means for setting multi-level data for reproducing a desired color; and
  second writing means for writing, in advance, the multi-level data about each color component set by said second setting means in said N memory units.

13. An image processing apparatus for converting binary pixel data into multi-level pixel data, comprising:
  N memory units having the same address space for storing multi-level pixel data;
  setting means for setting multi-level data about M color components for reproducing a desired color;
  M registers holding the multi-level data about M color components set by said setting means;
  a data bus having at least N bits;
  input means for inputting N items of binary pixel data parallel from said data bus; and
  N conversion means for converting the input binary pixel data into multi-level pixel data, wherein the conversion means i ($1 \leq i \leq N$) comprises:
  pulse signal generation means for successively generating pulse signals in a number corresponding to at least the number M of said color components each time binary pixel data is input by said input means;
  count means for counting the number of pulses generated from said pulse signal generation means, said count means being reset when binary pixel data is input by said input means;
  output means for selecting one of said M registers on the basis of the number of pulses counted by said count means and for outputting the multi-level data of the color component held by the selected register to the memory unit i; and
  output means for outputting a signal indicating whether or not writing in the memory unit i is permitted in accordance with the state of the binary pixel data i in said N items of binary pixel data.

14. An image processing apparatus according to claim 13, wherein said M color components for reproducing a color are red, green and blue.

15. An image processing apparatus according to claim 13, wherein said M color components for reproducing a color are yellow, magenta, cyan and black.

16. An image processing apparatus according to claim 13, wherein the multi-level data of each color component is manually set using said setting means.

17. An image processing apparatus according to claim 13, further comprising:
  read means for reading the multi-level data stored in said N memory units; and
  image forming means for forming a visible image on the basis of the read multi-level data of each color component.

18. An image processing apparatus according to claim 13, wherein said image forming means is a color printer.

19. An image processing apparatus according to claim 13, further comprising:
  second setting means for setting multi-level data about each color component for reproducing a desired color; and
  second write means for writing, in advance, the multi-level data set by said second setting means in said N memory units.

20. An image processing method for converting binary image data into multi-level image data, comprising the steps of:
  setting multi-level data;
  converting N ($N \geq 2$) items of binary pixel data, which are input in parallel, into N multi-level data set in said setting step on the basis of the state of each of the binary pixel data;
  deciding whether or not a writing step is to be executed; and
  responsive to a decision to write in said deciding step, writing i-th ($1 \leq i \leq N$) multi-level data converted in said converting step in the i-th memory of N memory units which have the same address space for storing multi-level pixel data.

21. An image processing method according to claim 20, wherein said deciding step includes deciding to execute said writing step when the i-th binary pixel data is a first state, but not to execute said writing step when the i-th binary pixel data is a second state.

22. An image processing method according to claim 20, wherein the multi-level data is manually set in said setting step.

23. An image processing method according to claim 20, further comprising the steps of:
  reading the multi-level data stored in the N memory units; and
  forming a visible image by outputting data to a predetermined device on the basis of the multi-level data read in said reading step.

24. An image processing method according to claim 23, wherein the predetermined device is a printer.

25. An image processing method according to claim 20, further comprising:
  a second setting step of setting desired multi-level data; and
  a second writing step of writing, in advance, the multi-level data set in said second setting step in the N memory units.

26. An image processing method for converting binary image data into multi-level image data, comprising the steps of:
  setting multi-level data about M color components for reproducing a desired color;
  converting N ($N \geq 2$) items of binary pixel data into N multi-level color data on the basis of the state of each of the binary pixel data, each of the multi-level color data including M multi-level data about color components set in setting step;
  deciding whether or not a writing step is executed; and
  responsive to a decision in said deciding step, selectively writing or not writing i-th multi-level color data converted by said converting step in i-th memory unit of N memory units which have the same address space.

27. An image processing method according to claim 26, wherein said deciding step includes deciding to execute said writing step when the i-th binary pixel data supplied in a first state, but not to execute said writing step when the i-th binary pixel data is a second state.

28. An image processing method according to claim 26, wherein the multi-level data about each color component is manually set in said setting step.

29. An image processing method according to claim 26, further comprising the steps of:
   reading the multi-level data bout each color component stored in the N memory units; and
   forming a color visible image by outputting data on the basis of the read multi-level data of each color component to a predetermined device.

30. An image processing method according to claim 29, wherein the predetermined device is a color printer.

31. An image processing method according to claim 26, further comprising the steps of:
   a second setting step of setting multi-level data for reproducing a desired color; and
   a second writing step of writing, in advance, the multi-level data about each color component setting said second setting step in the N memory units.

32. An image processing method for converting binary pixel data to the multi-level pixel data, comprising the steps of:
   (a) setting multi-level data about M color components for reproducing a desired color and storing each of the set multi-level data into M registers;
   (b) inputting N (N≧2) items of binary pixel data in parallel from a data bus which has at least N bits;
   (c) converting input N items of binary pixel data into N multi-level color data on the basis of the state of each binary pixel data, each of the multi-level color data including M multi-level data about color components set by step (a); and
   (d) writing i-th (1≦1≦N) multi-level color data of the N multi-level color data in an i-th memory unit of N memory units which have the same address space, wherein said converting step (c) for i-th binary pixel data of the N items of binary pixels data input in step (b), further comprises:
   (e) generating successively pulse signals in a number corresponding to at least the number M of the color components each time binary pixel data is input in step (b);
   (f) counting the number of the pulses generated in step (e), wherein counting in said counting step is reset whenever binary pixel data is input in step (b);
   (g) selecting one of the M registers on the basis of the number of pulses counted in step (f) and outputting the multi-level data of the color component stored in the selected register to i-th memory unit; and
   (h) deciding whether or not writing in the i-th memory unit is permitted, in accordance with the state of the i-th binary pixel date in the N items of binary pixel data.

33. An image processing method according to claim 32, wherein the M color components for reproducing a color are red, green and blue.

34. An image processing method according to claim 32, wherein the M color components for reproducing a color are yellow, magenta, cyan and black.

35. An image processing method according to claim 32, wherein the multi-level data of each color component is manually set in said step (a).

36. An image processing method according to claim 32, further comprising the steps of:
   reading the multi-level color data stored in the N memory units; and
   forming a visible image by outputting data on the basis of the read multi-level color data of each color component to a predetermined device.

37. An image processing method according to claim 36, wherein the predetermined device is a color printer.

38. An image processing method according to claim 32, further comprising the steps of:
   a second setting step of setting multi-level data about each color component for reproducing a desired color; and
   a second writing step of writing, in advance, the multi-level data set in said second setting step in the N memory units.

* * * * *

UNITED STATES PATENT AND TRADEMARK OFFICE
CERTIFICATE OF CORRECTION

PATENT NO. : 5,355,233
DATED : October 11, 1994
INVENTOR(S) : YOSHIFUMI OKAMOTO

Page 1 of 4

It is certified that error appears in the above-identified patent and that said Letters Patent is hereby corrected as shown below: TITLE PAGE:

[56] References Cited

U.S. PATENT DOCUMENTS, insert --5,003,494  3/1991 Ng ...364/519; 4,949,190  8/1990 Thompson ...358/426; 4,937,681  6/1990 Fujinawa et al. ...358/323; and 4,681,470  7/1987 Nakajima ...400/323--.

FOREIGN PATENT DOCUMENTS, insert 320713  6/1989 European Pat. Off. ...H04/N1/21 and 2643994  9/1990 France ...G06/F12/2--.

COLUMN 1

Line 16, "Combination" should read --Combinations--; and
Line 47, "multi,level" should read --multi-level--.

COLUMN 2

Line 33, "depended thereto." should read --appended thereto--; and
Line 56, "chart of" should read --chart for--.

COLUMN 3

Line 62, "numeral;" should read --numeral--; and
Line 64, delete "and".

COLUMN 4

Line 5, "cassettes 737 and 738," should read --cassettes 735 and 736,--;
Line 49, "main" should read --a main--;
Line 58, "inside" should read --inside of--; and
Lines 59/60, "gener-/ally manner" should read --general case--.

UNITED STATES PATENT AND TRADEMARK OFFICE
CERTIFICATE OF CORRECTION

PATENT NO. : 5,355,233
DATED : October 11, 1994
INVENTOR(S) : YOSHIFUMI OKAMOTO

It is certified that error appears in the above-identified patent and that said Letters Patent is hereby corrected as shown below:

COLUMN 5

Line 67, "comprise" should read --comprises--.

COLUMN 6

Line 6, "patter" should read --pattern--; and
Line 41, "patter" should read --pattern--.

COLUMN 7

Line 28, "ARM 102b," should read --RAM 102b,--;
Line 51, "output 213a," should read --outputs 213a,--; and
Line 65, "data $D_{24}$" should read --data $D_{24}$ to $D_{31}$--..

COLUMN 8

Line 4, "invertor" should read --inverter--;
Line 8, "invertor" should read --inverter--;
Line 10, "output 215" should read --outputs 215--;
Line 25, "120c should read --102c--; and
Line 65, "output" should read --outputs--.

COLUMN 9

Line 1, "register 202b ," should read --register 202b,--;
Line 39, "output 211" should read --outputs 211--; and
Line 41, "register 202b ," should read --register 202b,--.

COLUMN 11

Line 22, ".on" should read --on--; and
Line 41, "respectively" should read --respectively.--

UNITED STATES PATENT AND TRADEMARK OFFICE
CERTIFICATE OF CORRECTION

PATENT NO. : 5,355,233
DATED : October 11, 1994
INVENTOR(S) : YOSHIFUMI OKAMOTO

It is certified that error appears in the above-identified patent and that said Letters Patent is hereby corrected as shown below:

COLUMN 12

Line 5, "for,reproducing" should read --for reproducing--;
Line 30, "completed" should read --completely--; and
Line 50, "in to" should read --into--.

COLUMN 13

Line 4, "a" (second occurrence) should read --an--;
Line 14, "DO" should read --D0--;
Line 46, "present" should read --the present--;
Line 65, "sprint" should read --spirit--; and
Line 67, "excepts" should read --except--.

COLUMN 14

Line 4, "N N$\geq$2)" should read --N (N$\geq$2)--;
Line 24, "binary/multi-level" should read --i-th binary/multi-level--; and
Line 46, "N N$\geq$2)" should read --N (N$\geq$2)--.

COLUMN 15

Line 1, "binary/multi-level" should read --i-th binary/multi-level--.

COLUMN 16

Line 63, "setting" should read --said setting--.

COLUMN 17

Line 6, "supplied" should read --is supplied--;
Line 14, "bout" should read --about--; and
Line 43, "(1 $\leq$ 1 $\leq$ N)" should read --(1 $\leq$ i $\leq$ N)--.

UNITED STATES PATENT AND TRADEMARK OFFICE
CERTIFICATE OF CORRECTION

PATENT NO. : 5,355,233

DATED : October 11, 1994

INVENTOR(S) : YOSHIFUMI OKAMOTO

It is certified that error appears in the above-identified patent and that said Letters Patent is hereby corrected as shown below:

COLUMN 18

Line 1, "pixels" should read --pixel--; and
Line 19, "date" should read --data--.

Signed and Sealed this

Ninth Day of May, 1995

Attest:

BRUCE LEHMAN

Attesting Officer

Commissioner of Patents and Trademarks